(12) United States Patent  
Ma et al.

(10) Patent No.: US 12,395,538 B2  
(45) Date of Patent: Aug. 19, 2025

(54) SIGNALING MEDIA TIMING INFORMATION FROM A MEDIA APPLICATION TO A NETWORK ELEMENT

(71) Applicant: QUALCOMM Incorporated, San Diego, CA (US)

(72) Inventors: Liangping Ma, San Diego, CA (US); Prashanth Haridas Hande, San Diego, CA (US); Thomas Stockhammer, Bergen (DE); Imed Bouazizi, Frisco, TX (US); Martin Renschler, San Diego, CA (US); Anantharaman Balasubramanian, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 216 days.

(21) Appl. No.: 18/163,622

(22) Filed: Feb. 2, 2023

(65) Prior Publication Data

US 2024/0267421 A1    Aug. 8, 2024

(51) Int. Cl.
*H04L 65/70* (2022.01)
*H04L 65/65* (2022.01)
*H04L 65/80* (2022.01)

(52) U.S. Cl.
CPC .............. *H04L 65/70* (2022.05); *H04L 65/65* (2022.05); *H04L 65/80* (2013.01)

(58) Field of Classification Search
CPC .......... H04L 65/65; H04L 65/70; H04L 65/75
See application file for complete search history.

(56) References Cited

U.S. PATENT DOCUMENTS

| | | | |
|---|---|---|---|
| 6,954,796 B2 | 10/2005 | Tan et al. | |
| 10,779,276 B2 | 9/2020 | Ji et al. | |
| 10,911,514 B2* | 2/2021 | Cheung | H04L 65/80 |
| 2010/0111023 A1 | 5/2010 | Pelletier et al. | |
| 2012/0140633 A1* | 6/2012 | Stanwood | H04N 21/64723 370/235 |
| 2015/0244650 A1* | 8/2015 | Yang | H04L 49/552 348/180 |
| 2016/0072637 A1 | 3/2016 | Gholmieh et al. | |

(Continued)

FOREIGN PATENT DOCUMENTS

WO    2019237927 A1    12/2019

OTHER PUBLICATIONS

Wei-Ming Jin, et al. "A Data Transmission Method and Video Online Terminal Based on Internet", Sep. 20, 2019, CN 110267099 A (English Translation), pp. 1-20 (Year: 2019).*

(Continued)

*Primary Examiner* — Jonathan A Bui
(74) *Attorney, Agent, or Firm* — Shumaker & Sieffert, P.A.

(57) ABSTRACT

An example device for exchanging media data via a network includes a memory configured to store media data; and one or more processors implemented in circuitry and configured to: retrieve data representative of an expected time between a first frame of media data and a second frame of the media data from a media application; receive the first frame of the media data at a first time; wait to process the second frame of the media data until a second time that is equal to or greater than the first time plus the expected time; and process the second frame of the media data at the second time.

43 Claims, 5 Drawing Sheets

(56) References Cited

U.S. PATENT DOCUMENTS

| | | | |
|---|---|---|---|
| 2018/0183849 A1* | 6/2018 | Shin | H04L 65/65 |
| 2021/0076071 A1* | 3/2021 | Lee | G06F 3/04817 |
| 2021/0297959 A1 | 9/2021 | Zhou et al. | |
| 2021/0337523 A1 | 10/2021 | Shen et al. | |
| 2021/0360480 A1* | 11/2021 | Oyman | H04L 65/65 |

OTHER PUBLICATIONS

Rui-Min Hu, et al., "Mobile Audio/video Real-time Communication Method Under 3G Network Environment", Nov. 25, 2011, CN 102497578 (English Translation), pp. 1-20 (Year: 2011).*

Xiaodong Wang, "Display Control Method, Device and System", Jul. 3, 2020, WO 2022000497 A1 (English Translation), pp. 1-20 (Year: 2020).*

International Search Report and Written Opinion—PCT/US2024/012242—ISA/EPO—May 22, 2024.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services - Coding of Moving Video", Versatile Video Coding, The International Telecommunication Union, Aug. 2020, 516 pages.

Nokia Corporation: "[5G_RTP] Signaling the Time to Next Burst", 3GPP TSG SA WG 4 meeting #123-e, Apr. 17-21, 2023, S4-230546, pp. 1-6.

* cited by examiner

SIGNALING MEDIA TIMING INFORMATION FROM A MEDIA APPLICATION TO A NETWORK ELEMENT

TECHNICAL FIELD

This disclosure relates to storage and transport of encoded media data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques for exchanging media data via a network. In 5G networks, as an example, a client device (user equipment or "UE") sends reception statistics to a base station (gNB). The reception statistics are typically tied to a frame rate for video data, such that signaling the reception statistics is based on a frame rate cadence. In some cases, it may be desirable for the client device to perform frame rate adaptation, e.g., based on network conditions. Modifying the frame rate in this manner may change the reception statistics reporting. However, the gNB would not have a way to determine when the frame rate changes. This disclosure describes techniques for signaling to the gNB a frame rate for media data, such that the gNB can be configured to receive the reception statistics correctly.

Modifying the frame rate may also modify times at which frames of video data will be received. For example, a client device may deactivate one or more hardware components related to receiving data for the frames during times between the frames. Such hardware components may include, for example, an antenna, processing circuitry, or the like. That is, after receiving a frame of video data at a particular frame rate, if the frame rate is constant, the client device may deactivate the hardware components for a period of time determined according to the frame rate, then reactivate the hardware components when the next frame is to be delivered. Furthermore, the gNB or other sending device may also determine not to send a subsequent frame, if the subsequent frame is received early, until the time at which the client device expects to receive the subsequent frame. In this manner, the client device can reduce power consumption when streaming media data over a network, which may improve battery life of a battery powered device such as a smart phone.

In one example, a method of exchanging media data via a network includes receiving, by a network device, data representative of an expected time between a first frame of media data and a second frame of the media data from a media application; receiving, by the network device, the first frame of the media data at a first time; waiting, by the network device, to process the second frame of the media data until a second time that is equal to or greater than the first time plus the expected time; and processing, by the network device, the second frame of the media data at the second time.

In another example, a device for exchanging media data via a network includes a memory configured to store media data; and one or more processors implemented in circuitry and configured to: retrieve data representative of an expected time between a first frame of media data and a second frame of the media data from a media application; receive the first frame of the media data at a first time; wait to process the second frame of the media data until a second time that is equal to or greater than the first time plus the expected time; and process the second frame of the media data at the second time.

In another example, a computer-readable storage medium has stored thereon instructions that, when executed, cause a processor of a network device to: receive data representative of an expected time between a first frame of media data and a second frame of the media data from a media application; receive the first frame of the media data at a first time; wait to process the second frame of the media data until a second time that is equal to or greater than the first time plus the expected time; and process the second frame of the media data at the second time.

In another example, a device for exchanging media data via a network includes means for receiving data representative of an expected time between a first frame of media data and a second frame of the media data from a media application; means for receiving the first frame of the media data at a first time; means for waiting to process the second frame of the media data until a second time that is equal to or greater than the first time plus the expected time; and means for processing the second frame of the media data at the second time.

The details of one or more examples are set forth in the accompanying drawings and the description below. Other features, objects, and advantages will be apparent from the description and drawings, and from the claims.

DETAILED DESCRIPTION

In general, this disclosure describes techniques for exchanging media data via a network. The network may be a 5G network or other radio access network (RAN). In 5G networks, a physical downlink control channel (PDCCH) is used to carry scheduling information to user equipment (UE) client devices. PDCCH monitoring cadence may be aligned with media data traffic cadence in the downlink channel, e.g., for extended reality (XR) media data, such as augmented reality (AR), mixed reality (MR), virtual reality (VR), video data, audio data, or the like. For example, for 60 frame per second (FPS) media data, discontinuous reception (DRX) periodicity may be used to monitor the downlink data channel at 16 ms, 17 ms, and 17 ms, with the cycle repeating in that manner. PDCCH skipping may occur for intermediate periods, where the downlink channel is not monitored and data is not sent during the intermediate periods.

DRX in this manner is prefaced upon both the client device (e.g., user equipment, UE) and source device (e.g., base station, gNB) can determine the frame rate of the corresponding media data. In some cases, frame rate can change without network components having information that the frame rate has changed. That is, the frame rate may be changed at the application layer of the network stack, but information representing the change of frame rate may not be available to lower levels of the network stack. Certain video codecs, such as ITU-T H.265/High Efficiency Video Coding (HEVC) and ITU-T H.266/Virtual Video Coding (VVC), can support frame rates much higher than 60 FPS. Some applications, such as Web Real Time Communication (WebRTC), include techniques for performing frame rate adaptation based on network conditions. For example, when available bandwidth increases, higher frame rate data may be exchanged, whereas when available bandwidth decreases, lower frame rate data may be exchanged. This disclosure describes techniques for providing information representing a current frame rate for media data to lower layer components, e.g., networking components of network devices, to adapt network configuration to the current frame rate.

Providing information representing the current frame rate in this manner allows the network components to adjust network configuration based on the current frame rate. For example, a PDCCH/downlink sending/monitoring cadence may be modified to adjust to the current frame rate. Thus, each device involved in network communication of the media data can adapt the sending/monitoring cadence, such that frames are not missed while also allowing for battery power savings and improved processing efficiency at times when frames are not being transmitted.

Figure 1:
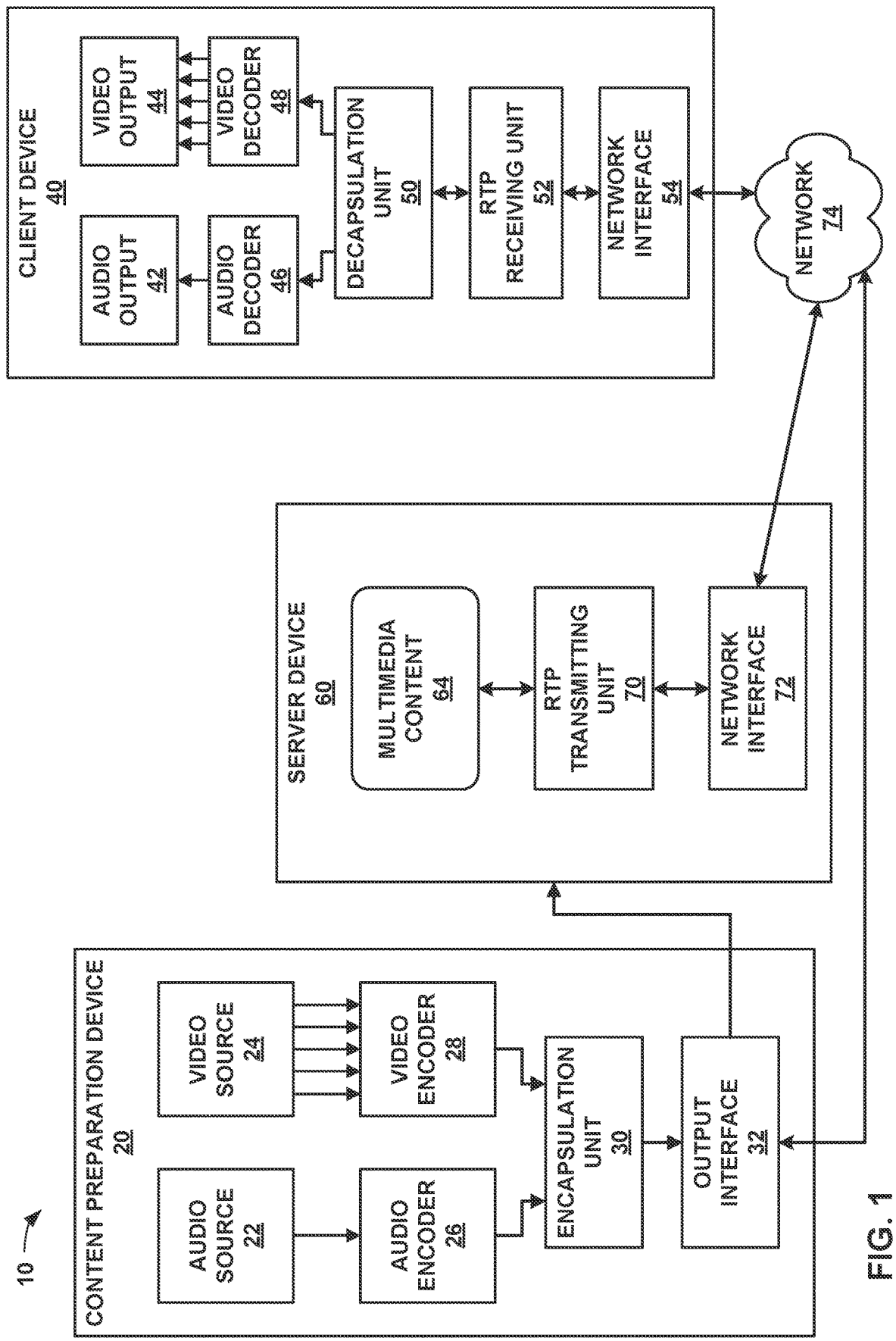
FIG. 1 is a block diagram illustrating an example system that implements techniques for streaming media data over a network.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for an encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a media presentation. For example, the coded video or audio part of the media presentation can be an elementary stream. An elementary stream may be converted into a packetized elementary stream (PES) before being encapsulated within a video file. Within the same media presentation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into streamable media data.

Encapsulation unit 30 receives PES packets for elementary streams of a media presentation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture; hence, coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points.

Server device 60 includes Real-time Transport Protocol (RTP) transmitting unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64 and include components that conform substantially to those of server device 60. In general, network interface 72 is configured to send and receive data via network 74.

RTP transmitting unit 70 is configured to deliver media data to client device 40 via network 74 according to RTP, which is standardized in Request for Comment (RFC) 3550 by the Internet Engineering Task Force (IETF). RTP transmitting unit 70 may also implement protocols related to RTP, such as RTP Control Protocol (RTCP), Real-time Streaming Protocol (RTSP), Session Initiation Protocol (SIP), and/or Session Description Protocol (SDP). RTP transmitting unit 70 may send media data via network interface 72, which may implement Uniform Datagram Protocol (UDP) and/or Internet protocol (IP). Thus, in some examples, server device 60 may send media data via RTP and RTSP over UDP using network 74.

RTP transmitting unit 70 may receive an RTSP describe request from, e.g., client device 40. The RTSP describe request may include data indicating what types of data are supported by client device 40. RTP transmitting unit 70 may respond to client device 40 with data indicating media streams, such as media content 64, that can be sent to client device 40, along with a corresponding network location identifier, such as a uniform resource locator (URL) or uniform resource name (URN).

RTP transmitting unit 70 may then receive an RTSP setup request from client device 40. The RTSP setup request may generally indicate how a media stream is to be transported. The RTSP setup request may contain the network location identifier for the requested media data (e.g., media content 64) and a transport specifier, such as local ports for receiving RTP data and control data (e.g., RTCP data) on client device 40. RTP transmitting unit 70 may reply to the RTSP setup request with a confirmation and data representing ports of server device 60 by which the RTP data and control data will be sent. RTP transmitting unit 70 may then receive an RTSP play request, to cause the media stream to be "played," i.e., sent to client device 40 via network 74. RTP transmitting unit 70 may also receive an RTSP teardown request to end the streaming session, in response to which, RTP transmitting unit 70 may stop sending media data to client device 40 for the corresponding session.

RTP receiving unit 52, likewise, may initiate a media stream by initially sending an RTSP describe request to server device 60. The RTSP describe request may indicate types of data supported by client device 40. RTP receiving unit 52 may then receive a reply from server device 60 specifying available media streams, such as media content 64, that can be sent to client device 40, along with a corresponding network location identifier, such as a uniform resource locator (URL) or uniform resource name (URN).

RTP receiving unit 52 may then generate an RTSP setup request and send the RTSP setup request to server device 60. As noted above, the RTSP setup request may contain the network location identifier for the requested media data (e.g., media content 64) and a transport specifier, such as local ports for receiving RTP data and control data (e.g., RTCP data) on client device 40. In response, RTP receiving unit 52 may receive a confirmation from server device 60, including ports of server device 60 that server device 60 will use to send media data and control data.

As part of establishing a media stream, RTP receiving unit 52 may request a particular frame rate for media data of the media stream. The frame rate may correspond to visual media data, such as video data, extended reality (XR) data, augmented reality (AR) data, mixed reality (MR) data, and/or virtual reality (VR) data. During a media session, RTP receiving unit 52 may request updated frame rates, e.g., an increased frame rate if available bandwidth increases or a decreased frame rate if available bandwidth decreases.

After establishing a media session between server device 60 and client device 40, RTP transmitting unit 70 of server device 60 may send media data (e.g., packets of media data) to client device 40 according to the media session. Server device 60 and client device 40 may exchange control data (e.g., RTCP data) indicating, for example, reception statistics by client device 40, such that server device 60 can perform congestion control or otherwise diagnose and address transmission faults.

Network interface 54 may receive and provide media of a selected media presentation to RTP receiving unit 52, which may in turn provide the media data to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

According to the techniques of this disclosure, RTP receiving unit 52 may request a particular frame rate from RTP transmitting unit 70 of server device 60. RTP transmitting unit 70, in turn, may signal the frame rate in an RTP packet such that network interface 72 and network interface 54 can extract and determine the frame rate from the RTP packet. The frame rate may be signaled in an RTP header or in a payload of the packet at a portion of the payload that is accessible to lower level components, such as network interface 72 and network interface 54.

Network interface 72 may extract the frame rate information from a current packet in order to determine scheduling information for a subsequent packet of the media session. If network interface 72 receives the subsequent packet before the scheduled time to send the subsequent packet, network interface 72 may buffer the subsequent packet until the scheduled time and then send the subsequent packet at the scheduled time. Thus, in some examples, RTP transmitting unit 70 of server device 60 may represent an application that indicates a delay between two frames or a frame rate for the two frames. Alternatively, encapsulation unit 30 of content preparation device 20 may signal the delay to output interface 32, which may signal the delay or frame rate in a packet header of a packet sent to server device 60 or client device 40.

In some examples, client device 40 may include components similar to those of content preparation device 20 and/or server device 60, such that client device 40 may participate in a live communication session with other client devices. That is, each client device may both send and receive media data according to the techniques of this disclosure. When sending media data, client device 40 may perform the functionality attributed to content preparation device 20 and server device 60.

A gNB may include components similar to those of server device 60, and may receive a packet from an upstream network device, such as a router or content preparation device 20. When the gNB determines an RTP/SRTP packet burst (that is, a group of RTP packets) for a current frame, the gNB may determine when the RTP packet burst for the next frame will arrive according to a signaled time difference and jitter of a network. Thus, signaling the delay between frames may support arbitrary frame rate adaptation. Components of a radio access network (RAN) may leverage this information with dynamic scheduling. For example, downlink control information (DCI) may provide a time duration equal to the indicated delay between frames, during which client device 40 may skip PDCCH monitoring.

As another example, the frame rate itself may be signaled via a signaling protocol, a signaling packet, or in a packet itself, such as an RTP, SRTP, or RTCP packet. In some examples, content preparation device 20 and/or server device 60 may signal statistics related to the framerate, such as jitter (e.g., using session description protocol (SDP)), if the frame rate is not highly dynamic. The indication may be sent to an application function (AF) or network exposure function (NEF).

In some examples, content preparation device 20 or server device 60 may signal frame rates in the packets themselves if the frame rate is highly dynamic. The packet may carry an instantaneous frame rate value, which may be added to a field of an RTP or RTCP payload or header, or to an SRTP header.

In some examples, devices within network 74 may signal various supported frame rates to at least one application executed by server device 60 and at least one application executed by, e.g., via an application function (AF) or a network exposure function (NEF). The supported frame rates may be signaled as an indexed list, such that client device 40 may select one of the supported frame rates and send an index corresponding to the selected frame rate to server device 60 or content preparation device 20. In some examples, a frame rate may be negotiated between a head mounted device (HMD), such as XR/AR/MR/VR goggles or other XR-capable equipment, and an application for providing XR data to the HMD. This negotiation may include the signaled supported frame rates of the network. The application may be configured to select from the available frame rates based on, e.g., device capability, network conditions, available bandwidth, or the like, and indicate the selection using SDP or RTP/SRTP packets. The indication may be used by the network (e.g., server device 60) for network configuration and resource allocation.

In this manner, content preparation device 20 and server device 60 represent examples of a device for exchanging media data via a network, including a memory configured to store media data; and one or more processors implemented in circuitry and configured to: retrieve data representative of an expected time between a first frame of media data and a second frame of the media data from a media application; receive the first frame of the media data at a first time; wait to process the second frame of the media data until a second time that is equal to or greater than the first time plus the expected time; and process the second frame of the media data at the second time.

The data representative of the expected time may directly indicate the expected time. For example, the data representative of the expected time may be a value equal to the expected time itself. Alternatively, the data representative of the expected time may be an indirect representation of the expected time, e.g., a frame rate value or an offset value.

Network interface 72 may retrieve the signaled frame rate or signaled delay value from RTP data received from RTP transmitting unit 70. Alternatively, RTP transmitting unit 70 may signal available frame rates and receive data from client device 40 including an index representing a selected one of the available frame rates. A signaled frame rate represents an expected time between media data (e.g., a frame) of the current packet and media data (a subsequent frame) of a subsequent packet. In some examples, a signaled frame rate may represent the reciprocal of an expected time between media data (e.g., a frame) of the current packet and media data (a subsequent frame) of a subsequent packet, and as a result, the unit may be in frames per some time unit (e.g., frames per second). Network interface 72 may buffer data of the subsequent frame in a memory until a scheduled time for transmission, then process (transmit) the subsequent frame at the scheduled time.

Similarly, network interface 54 may extract the frame rate information from a current packet in order to determine scheduling information for a subsequent packet of the media session. In particular, network interface 54 may be configured to disable one or more hardware components associated with monitoring a downlink channel for receiving data from network interface 72 until a scheduled time for the subsequent packet to be received. Additionally or alternatively, network interface 54 may observe a delay period until the scheduled time for the subsequent packet to be received. In some examples, network interface 54 may delay processing of the subsequent packet until the scheduled time.

In this manner, client device 40 represents another example of a device for exchanging media data via a network, including a memory configured to store media data; and one or more processors implemented in circuitry and configured to: retrieve data representative of an expected time between a first frame of media data and a second frame of the media data from a media application; receive the first frame of the media data at a first time; wait to process the second frame of the media data until a second time that is equal to or greater than the first time plus the expected time; and process the second frame of the media data at the second time.

In particular, network interface 54 may retrieve a signaled frame rate from RTP data received from server device 60 (and in particular, RTP transmitting unit 70 of server device 60). The signaled frame rate represents an expected time between media data (e.g., a frame) of the current packet and media data (a subsequent frame) of the subsequent packet. In some examples, a signaled frame rate represents the reciprocal of an expected time between media data (e.g., a frame) of the current packet and media data (a subsequent frame) of a subsequent packet, and as a result the unit may be in frames per some time unit (e.g., frames per second). Network interface 54 may disable one or more hardware components associated with monitoring a downlink channel from server device 60, thereby waiting to process the subsequent frame until a scheduled time for transmission. At the scheduled time, network interface 54 may activate the one or more hardware components to receive the subsequent frame from server device 60. Additionally or alternatively, network interface 54 may observe a delay period until the scheduled time for the subsequent packet to be received. In some examples, network interface 54 may delay processing of the subsequent packet until the scheduled time.

Video encoder 28, video decoder 48, audio encoder 26, audio decoder 46, encapsulation unit 30, RTP receiving unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, RTP receiving unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via RTP receiving unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Figure 2:
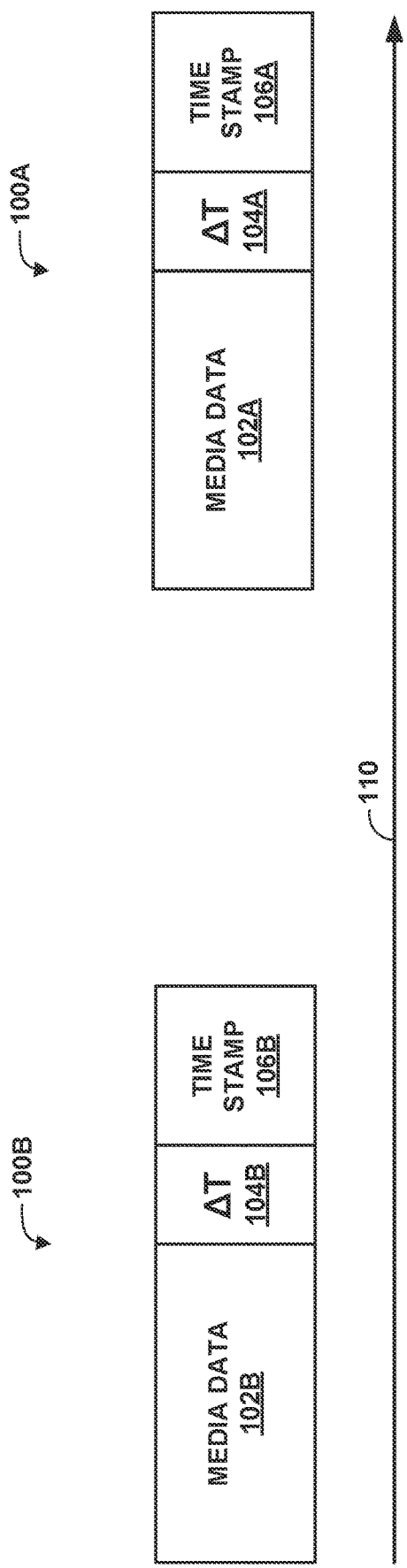
FIG. 2 is a conceptual diagram illustrating an example of signaling data representing a frame rate or other time between packets in a packet including media data according to the techniques of this disclosure.

FIG. 2 is a conceptual diagram illustrating an example of signaling data representing a frame rate or other time between packets in a packet including media data according to the techniques of this disclosure. In the example of FIG. 2, media stream 110 includes packet 100A and packet 100B. Packet 100A includes time stamp value 106A, delta time ($\Delta T$) value 104A, and media data 102A, and packet 100B includes time stamp value 106B, $\Delta T$ value 104B, and media data 102B.

In some examples, packet 100A is the first packet that carries a larger media data (e.g., a video frame) that includes media data 102A. In some examples, packet 100B is the first packet that carries a larger media data (e.g., a video frame) that includes media data 102B. In some examples, packet 100A is any of the packets that carry a larger media data (e.g., a video frame) that includes media data 102A. In some examples, packet 100B is any of the packets that carry a larger media data (e.g., a video frame) that includes media data 102B. The delta time ($\Delta T$) may be in the format of Coordinated Universal Time (UTC), a truncated version of UTC, or in the units of a media data sampling period. In some examples, a frame rate with the unit of frames per second may replace the delta time ($\Delta T$), and the frame rate may be equal to the reciprocal of $\Delta T$.

In this example, $\Delta T$ value 104A represents an example of a value representative of a time between packet 100A and packet 100B. For example, $\Delta T$ value 104A may be a current frame rate of media data 102A. In some examples, $\Delta T$ value 104A may represent a frame rate value for a certain number of frames including a frame of media data 102A. That is, the signaled frame rate value may represent a frame rate for each of a plurality of frames in a sequence of frames starting with a frame of media data 102A. In this case, $\Delta T$ value 104B need not necessarily be signaled. Alternatively, $\Delta T$ value 104A may represent an expected time of receipt of packet 100B. For example, $\Delta T$ value 104A may represent an expected time between packet 100A and packet 100B. In some examples, $\Delta T$ value 104A may represent expected times between each of a sequence of packets including packets 100A, 100B. In some examples, $\Delta T$ value 104A may be signaled in a payload portion of packet 100A that is accessible to network devices (e.g., an unencrypted portion of the payload).

In some examples, $\Delta T$ value 104A may be signaled in a header of packet 100A, such as in an RTP header, an RTSP header, an SRTP header, or an RTCP header. In some examples, packet 100A may be encapsulated with a tunnel header, and $\Delta T$ value 104A may be signaled in the tunnel header. The tunnel header may be, for example, a header according to a General Packet Radio Service (GPRS) Tunneling Protocol User Data Tunneling (GTP-U). In some examples, $\Delta T$ value 104A may be copied to a GTP-U packet header when an RTP packet is encapsulated to form a GTP-U packet. Thus, $\Delta T$ value 104A may provide benefits to routing devices of a 5G network or other network, where the routing devices may determine when packet 100B is expected to be received, and may disable one or more hardware components or perform other operations, such as load balancing. In some examples, $\Delta T$ value 104A may be signaled in an IP packet option field of packet 100A.

Content preparation device 20 or server device 60 of FIG. 1 may be configured to calculate $\Delta T$ value 104A based on one or more factors, such as complexity of the scene, where there is a scene change occurring or not, computing power available, inter-frame delays in the past, or the like.

In some examples, in addition or in the alternative, $\Delta T$ value 104A may be signaled for a protocol data unit (PDU) set and/or a PDU set burst. A PDU set represents a set of IP packets carrying a unit of information at the application layer, such as a slice of a video frame. A PDU set burst is a set of IP packets or PDU sets that should be delivered to a UE (such as client device 40) with the same deadline, such as all slices of a video frame or all data of an access unit.

Figure 3:
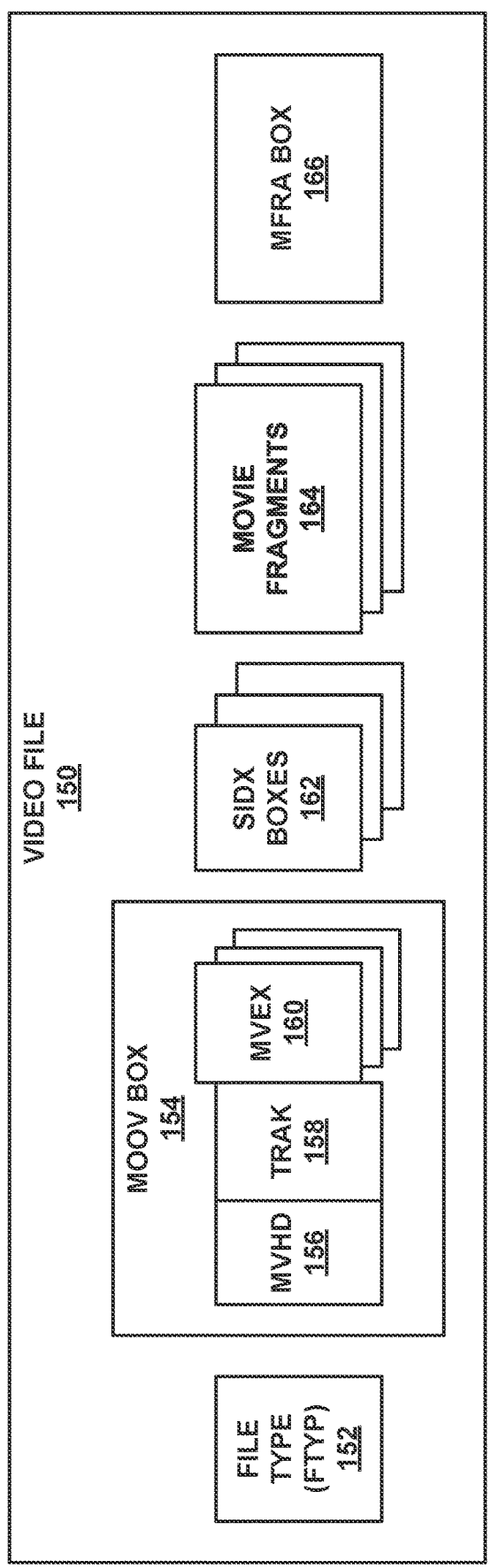
FIG. 3 is a block diagram illustrating elements of an example video file.

FIG. 3 is a block diagram illustrating elements of an example video file 150. As described above, video files in accordance with the ISO base media file format and extensions thereof store data in a series of objects, referred to as "boxes." In the example of FIG. 3, video file 150 includes file type (FTYP) box 152, movie (MOOV) box 154, segment index (sidx) boxes 162, movie fragment (MOOF) boxes 164, and movie fragment random access (MFRA) box 166. Although FIG. 3 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

MOOV box 154, in the example of FIG. 3, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 1) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units, which contain the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 3). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

A frame rate for media data of video file 150 may be signaled in, e.g., MVHD 156. In addition, when content preparation device 20 packetizes frames of movie fragments 164, content preparation device 20 may encapsulate all or a portion of one of movie fragments 164 and add data representing the frame rate to a header of the packet. Thus, data representing the frame rate may be accessible to network devices downstream from content preparation device 20. In addition, client device 40 may determine an expected time of receipt of a subsequent packet. Thus, client device 40 may disable one or more hardware components related to receiving the subsequent packet until the expected time, to reduce power consumption and processing operations until the expected time.

Figure 4:
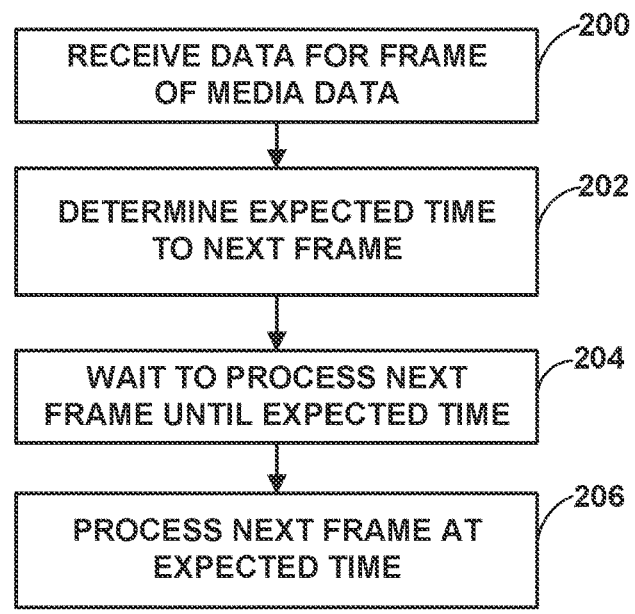
FIG. 4 is a flowchart illustrating an example method of exchanging media data via a network according to the techniques of this disclosure.

FIG. 4 is a flowchart illustrating an example method of exchanging media data via a network according to the techniques of this disclosure. The method of FIG. 4 may be performed by content preparation device 20, server device 60, or client device 40 of FIG. 1, a base station such as a gNB, user equipment (UE), a router, or other various networking devices. For purposes of explanation, the method of FIG. 4 is explained with respect to a media communication device, which may correspond to any of content preparation device 20, server device 60, or client device 40 of FIG. 1, a base station such as a gNB, a UE, a router, or other such devices.

Initially, a media communication device may receive data for a frame of media data (200). For example, server device 60, a base station, or client device 40 may receive one or more packets, protocol data unit (PDU) sets, or PDU set bursts including data for a frame of media data, such as one or more slices of the frame, e.g., from content preparation device 20 or another client device/UE. As another example, content preparation device 20 or client device 40 may obtain (e.g., receive, capture, or generate) a frame of media data to be sent to a client device/UE.

The media communication device may then determine an expected time to the next frame (202). For example, when the media communication device is generating/encoding/transmitting the media content, such as when content preparation device 20, client device 40, or other UE is generating and sending media content, the media communication device may estimate the time to the next frame based on, for example, complexity of a current scene, whether there is a scene change occurring, computing power, past inter-frame delays, or the like. Additionally, such device may form a packet including data indicating an expected delay to the next frame, such as a frame rate or delay value.

In some examples, the media communication device, acting as a source of the media content, may signal one or more supported frame rates to, e.g., client device 40, and receive a selection of one of the supported frame rates from client device 40. Thus, the media communication device may determine the expected time to the next frame according to the selected frame rate.

Alternatively, when the media communication device is receiving media data, such as when the media communication device is one of server device 60, an intermediate network routing device, or client device 40 and receiving media data, the media communication device may determine the expected time from data signaled in a packet including the data for the current frame, such as ΔT value 104A of FIG. 2. The data may be signaled in the packet in a header or a portion of a payload of the packet that is accessible to network devices, as discussed above.

The media communication device may then wait to process the next frame until the expected time (204). For example, when the media communication device is a source of the frame (e.g., content preparation device 20 or client device 40 sending media data), the media communication device may buffer data for the next frame until the expected time, then send the buffered data for the next frame at or after the expected time. Similarly, when the media communication device is an intermediate device between two endpoint devices (e.g., content preparation device 20 and client device 40 or two client devices), such as a router, base station, or server device 60, the media communication device may buffer any received data for the next frame until the expected time, then send the data for the next frame at the expected time. Alternatively, when the media communication device is an endpoint, such as client device 40 or UE, that receives the media data, the media communication device may disable one or more hardware components associated with receiving media data until the expected time.

Ultimately, the media communication device may process the next frame at the expected time (206). For example, the media communication device may send the data for the next frame at the expected time when acting as a source or intermediate device, or activate hardware components to receive the next frame when acting as a destination device.

In this manner, the method of FIG. 4 represents an example of a method including receiving, by a network device, data representative of an expected time between a first frame of media data and a second frame of the media data from a media application; receiving, by the network device, the first frame of the media data at a first time; waiting, by the network device, to process the second frame of the media data until a second time that is equal to or greater than the first time plus the expected time; and processing, by the network device, the second frame of the media data at the second time.

Figure 5:
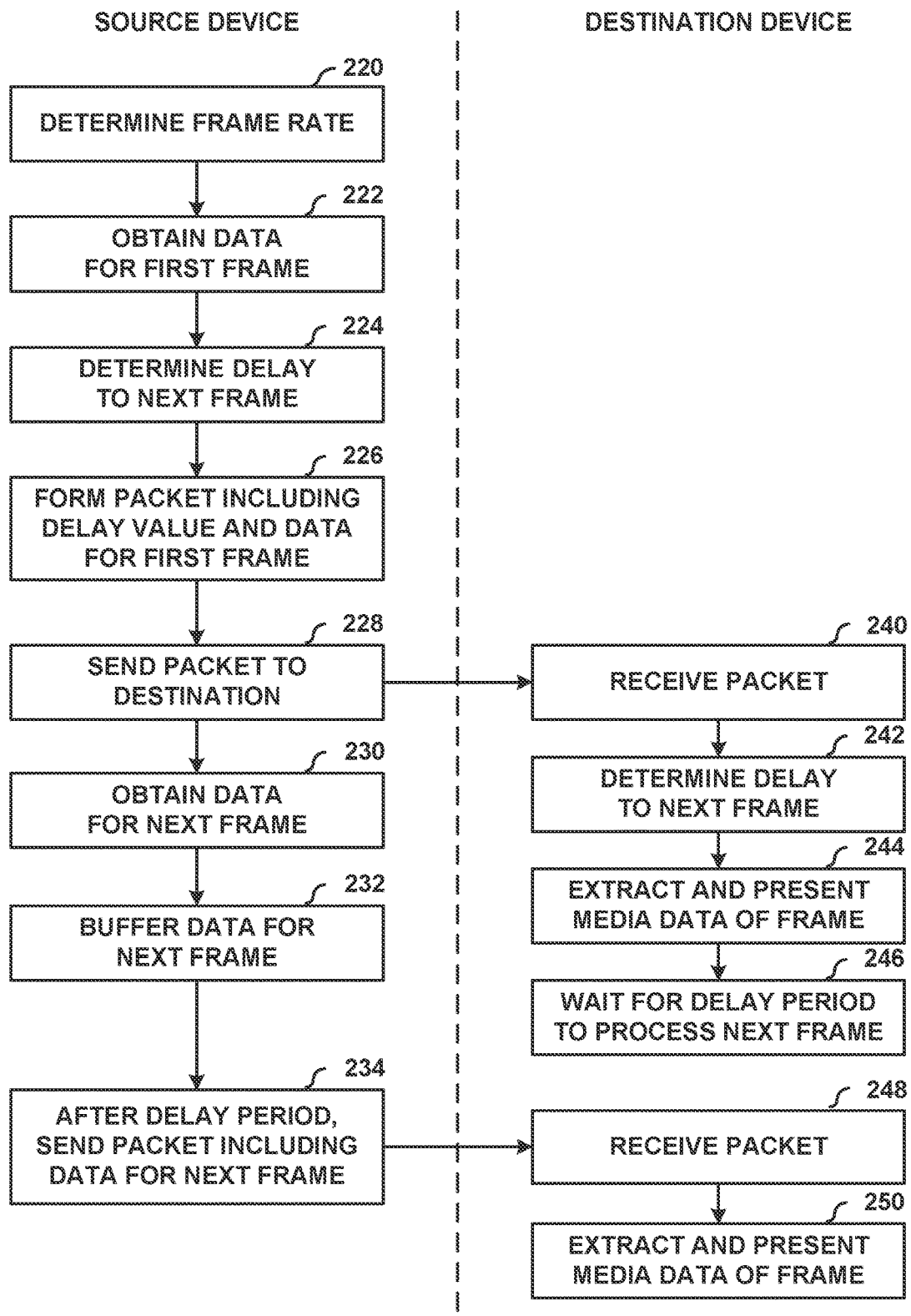
FIG. 5 is a flowchart illustrating another example method of exchanging media data via a network according to the techniques of this disclosure.

FIG. 5 is a flowchart illustrating another example method of exchanging media data via a network according to the techniques of this disclosure. The method of FIG. 5 is performed by devices labeled "source device" and "destination device." For example, the source device may be content preparation device 20 and the destination device may be client device 40 of FIG. 1. Alternatively, the source device may be a first client device/UE and the destination device may be a second client device/UE.

Initially the source device may determine a frame rate for a media communication session with the destination device (220). For example, the source device may determine a frame rate and determine delays between frames based on the frame rate. In some examples, the source device may support a variety of frame rates, and the destination device may request one of the supported frame rates, e.g., by sending an index into a list of the various frame rates. The frame rate may vary during the communication session, e.g., based on requests from the destination device and/or based on available bandwidth determined by the source device.

The source device may obtain data for a first frame of the media communication session (222). For example, the source device may capture or generate the data for the first frame, which may be a video frame, an XR/AR/MR/VR frame, or the like. The "first" frame need not necessarily be an ordinal first frame of the media communication session, but may correspond to any frame of the media communication session. The source device may also determine an expected delay to the next frame, e.g., based on the frame rate for the media communication session (224). The delay may, additionally or alternatively, be based on potential processing delays due to complexity of a virtual scene for the frame, computing power, or the like.

The source device may then form a packet including the delay value and data for the first frame (226). For example, the source device may form the packet as shown in FIG. 2 as packet 100A, to include both a payload including media data and an indication of a delay value (which may be in the payload or in a packet header, such as an RTP header). The source device may also send the packet to the destination device (228).

After sending the packet to the destination device, the source device may obtain data for a next frame (230). Again, the source device may capture or generate the data for the next frame. The source device may buffer the data for the next frame if the expected time to the next frame has not yet elapsed (232). After waiting a delay period corresponding to the expected time to the next frame, the source device may send packets including data for the next frame to the destination device (234).

The destination device, meanwhile, may initially receive the packet including the data for the first frame (240). The destination device may extract the signaled data for the delay to determine a delay to the next frame (242). Likewise, the destination device may extract and present media data of the first frame (244). The destination device may then wait for a delay period, based on the signaled data representing the delay to the next frame, to process the next frame (246). For example, the destination device may disable one or more hardware components related to monitoring a data communication channel, such as a PDCCH, until the expected time for the next frame.

After waiting to the end of this delay period, the destination device may reactivate the hardware components to receive packets for the next frame (248). The destination device may then extract and present media data of the next frame (250).

In this manner, both the source device and the destination device of FIG. 5 may perform a method including receiving, by a network device, data representative of an expected time between a first frame of media data and a second frame of the media data from a media application; receiving, by the network device, the first frame of the media data at a first time; waiting, by the network device, to process the second frame of the media data until a second time that is equal to or greater than the first time plus the expected time; and processing, by the network device, the second frame of the media data at the second time.

The following clauses summarize various examples of the techniques of this disclosure:

Clause 1: A method of exchanging media data via a network, the method comprising: receiving, by a network device, data representative of an expected time between a first frame of media data and a second frame of the media data from a media application; receiving, by the network device, the first frame of the media data at a first time; waiting, by the network device, to process the second frame of the media data until a second time that is equal to or greater than the first time plus the expected time; and processing, by the network device, the second frame of the media data at the second time.

Clause 2: The method of clause 1, wherein receiving the data representative of the expected time between the first frame and the second frame comprises receiving a packet including data for the first frame of the media data, the packet further including the data representative of the expected time.

Clause 3: The method of clause 2, wherein the packet comprises one of a Real-time Transport Protocol (RTP) packet, a Real Time Streaming Protocol (RTSP) packet, a Secure Real-time Transport Protocol (SRTP) packet, or an RTP Control Protocol (RTCP) packet.

Clause 4: The method of clause 2, further comprising: encapsulating the packet with a packet tunnel header; and adding the data representative of the expected time between the first frame and the second frame to the packet tunnel header.

Clause 5: The method of clause 4, wherein the packet tunnel header comprises a General Packet Radio Service (GPRS) Tunneling Protocol User Data Tunneling (GTP-U) packet header.

Clause 6: The method of clause 1, wherein receiving the data representative of the expected time between the first frame and the second frame comprises receiving data representative of an expected time between each of a plurality of frames in a sequence of frames starting with the first frame.

Clause 7: The method of clause 1, wherein receiving the data representative of the expected time between the first frame and the second frame comprises receiving a packet encapsulated with a packet tunnel header, the packet tunnel header including the data representative of the expected time between the first frame and the second frame.

Clause 8: The method of clause 7, wherein the packet tunnel header comprises a General Packet Radio Service (GPRS) Tunneling Protocol User Data Tunneling (GTP-U) packet header.

Clause 9: The method of clause 1, wherein receiving the data representative of the expected time between the first frame and the second frame comprises receiving a packet including the data representative of the expected time between the first frame and the second frame in an Internet Protocol (IP) packet option field.

Clause 10: The method of clause 1, wherein waiting to process the second frame comprises skipping monitoring of a data transmission channel until the second time, and wherein processing the second frame comprises: monitoring the data transmission channel starting at the second time; and receiving the second frame via the data transmission channel.

Clause 11: The method of clause 10, wherein the data transmission channel comprises a physical downlink control channel (PDCCH).

Clause 12: The method of clause 1, wherein waiting to process the second frame comprises: receiving the second frame prior to the second time; and transmitting the second frame at the second time.

Clause 13: The method of clause 1, further comprising sending the data representative of the expected time between the first frame and the second frame to a downstream network device.

Clause 14: The method of clause 1, wherein the data representative of the expected time between the first frame and the second frame comprises a frame rate value for at least a portion of a media stream for the media data.

Clause 15: The method of clause 14, wherein receiving the frame rate value comprises receiving the frame rate value from a session description protocol (SDP) message.

Clause 16: The method of clause 14, wherein receiving the frame rate value comprises receiving the frame rate value from a payload or header of a Real-time Transport Protocol (RTP) packet or an RTP Control Protocol (RTCP) packet or from a header of a Secure Real-time Transport Protocol (SRTP) packet.

Clause 17: The method of clause 14, further comprising sending data representative of one or more frame rates supported by the network device to the media application, wherein receiving the data representative of the frame rate comprises receiving data representing a selection of a frame rate from the one or more frame rates supported by the network device from the media application.

Clause 18: The method of clause 17, further comprising configuring network transmission for a media session for the media data according to the selection of the frame rate.

Clause 19: A device for exchanging media data via a network, the device comprising: a memory configured to store media data; and one or more processors implemented in circuitry and configured to: retrieve data representative of an expected time between a first frame of media data and a second frame of the media data from a media application; receive the first frame of the media data at a first time; wait to process the second frame of the media data until a second time that is equal to or greater than the first time plus the expected time; and process the second frame of the media data at the second time.

Clause 20: The device of clause 19, wherein to receive the data representative of the expected time between the first frame and the second frame, the one or more processors are configured to receive a packet including data for the first frame of the media data, the packet further including the data representative of the expected time.

Clause 21: The device of clause 20, wherein the packet comprises one of a Real-time Transport Protocol (RTP) packet, a Real Time Streaming Protocol (RTSP) packet, a Secure Real-time Transport Protocol (SRTP) packet, or an RTP Control Protocol (RTCP) packet.

Clause 22: The device of clause 20, wherein the one or more processors are further configured to: encapsulate the packet with a packet tunnel header; and add the data representative of the expected time between the first frame and the second frame to the packet tunnel header.

Clause 23: The device of clause 22, wherein the packet tunnel header comprises a General Packet Radio Service (GPRS) Tunneling Protocol User Data Tunneling (GTP-U) packet header.

Clause 24: The device of clause 19, wherein to receive the data representative of the expected time between the first frame and the second frame, the one or more processors are configured to receive data representative of an expected time between each of a plurality of frames in a sequence of frames starting with the first frame.

Clause 25: The device of clause 19, wherein to receive the data representative of the expected time between the first frame and the second frame, the one or more processors are configured to receive a packet encapsulated with a packet tunnel header, the packet tunnel header including the data representative of the expected time between the first frame and the second frame.

Clause 26: The device of clause 25, wherein the packet tunnel header comprises a General Packet Radio Service (GPRS) Tunneling Protocol User Data Tunneling (GTP-U) packet header.

Clause 27: The device of clause 19, wherein to receive the data representative of the expected time between the first frame and the second frame, the one or more processors are configured to receive a packet including the data representative of the expected time between the first frame and the second frame in an Internet Protocol (IP) packet option field.

Clause 28: The device of clause 19, wherein to wait to process the second frame, the one or more processors are configured to skip monitoring of a data transmission channel until the second time, and wherein to process the second frame, the one or more processors are configured to: monitor the data transmission channel starting at the second time; and receive the second frame via the data transmission channel.

Clause 29: The device of clause 28, wherein the data transmission channel comprises a physical downlink control channel (PDCCH).

Clause 30: The device of clause 19, wherein to wait to process the second frame, the one or more processors are configured to: receive the second frame prior to the second time; and transmit the second frame at the second time.

Clause 31: The device of clause 19, wherein the one or more processors are further configured to send the data representative of the expected time between the first frame and the second frame to a downstream network device.

Clause 32: The device of clause 19, wherein the data representative of the expected time between the first frame and the second frame comprises a frame rate value for at least a portion of a media stream for the media data.

Clause 33: The device of clause 32, wherein to receive the frame rate value, the one or more processors are configured to receive the frame rate value from a session description protocol (SDP) message.

Clause 34: The device of clause 32, wherein to receive the frame rate value, the one or more processors are configured to receive the frame rate value from a payload or header of a Real-time Transport Protocol (RTP) packet or an RTP Control Protocol (RTCP) packet or from a header of a Secure Real-time Transport Protocol (SRTP) packet.

Clause 35: The device of clause 32, wherein the one or more processors are further configured to send data representative of one or more frame rates supported by the network device to the media application, wherein to receive the data representative of the frame rate, the one or more processors are configured to receive data representing a selection of a frame rate from the one or more frame rates supported by the network device from the media application.

Clause 36: The device of clause 35, wherein the one or more processors are further configured to configure network transmission for a media session for the media data according to the selection of the frame rate.

Clause 37: The device of clause 19, wherein the apparatus comprises at least one of: an integrated circuit; a microprocessor; and a wireless communication device.

Clause 38: A computer-readable storage medium having stored thereon instructions that, when executed, cause a processor of a network device to: receive data representative of an expected time between a first frame of media data and a second frame of the media data from a media application; receive the first frame of the media data at a first time; wait to process the second frame of the media data until a second time that is equal to or greater than the first time plus the expected time; and process the second frame of the media data at the second time.

Clause 39: A device for exchanging media data via a network, the device comprising: means for receiving data representative of an expected time between a first frame of media data and a second frame of the media data from a media application; means for receiving the first frame of the media data at a first time; means for waiting to process the second frame of the media data until a second time that is equal to or greater than the first time plus the expected time; and means for processing the second frame of the media data at the second time.

Clause 40: A method of exchanging media data via a network, the method comprising: receiving, by a network device, data representative of an expected time between a first frame of media data and a second frame of the media data from a media application; receiving, by the network device, the first frame of the media data at a first time; waiting, by the network device, to process the second frame of the media data until a second time that is equal to or greater than the first time plus the expected time; and processing, by the network device, the second frame of the media data at the second time.

Clause 41: The method of clause 40, wherein receiving the data representative of the expected time between the first frame and the second frame comprises receiving a packet including data for the first frame of the media data, the packet further including the data representative of the expected time.

Clause 42: The method of clause 41, wherein the packet comprises one of a Real-time Transport Protocol (RTP) packet, a Real Time Streaming Protocol (RTSP) packet, a Secure Real-time Transport Protocol (SRTP) packet, or an RTP Control Protocol (RTCP) packet.

Clause 43: The method of any of clauses 41 and 42, further comprising: encapsulating the packet with a packet tunnel header; and adding the data representative of the expected time between the first frame and the second frame to the packet tunnel header.

Clause 44: The method of clause 43, wherein the packet tunnel header comprises a General Packet Radio Service (GPRS) Tunneling Protocol User Data Tunneling (GTP-U) packet header.

Clause 45: The method of any of clauses 40-42, wherein receiving the data representative of the expected time between the first frame and the second frame comprises receiving data representative of an expected time between each of a plurality of frames in a sequence of frames starting with the first frame.

Clause 46: The method of any of clauses 40-42 or 45, wherein receiving the data representative of the expected time between the first frame and the second frame comprises receiving a packet encapsulated with a packet tunnel header, the packet tunnel header including the data representative of the expected time between the first frame and the second frame.

Clause 47: The method of clause 46, wherein the packet tunnel header comprises a General Packet Radio Service (GPRS) Tunneling Protocol User Data Tunneling (GTP-U) packet header.

Clause 48: The method of any of clauses 40-42 or 45-47, wherein receiving the data representative of the expected time between the first frame and the second frame comprises receiving a packet including the data representative of the expected time between the first frame and the second frame in an Internet Protocol (IP) packet option field.

Clause 49: The method of any of clauses 40-42 or 45-48, wherein waiting to process the second frame comprises skipping monitoring of a data transmission channel until the second time, and wherein processing the second frame comprises: monitoring the data transmission channel starting at the second time; and receiving the second frame via the data transmission channel.

Clause 50: The method of clause 49, wherein the data transmission channel comprises a physical downlink control channel (PDCCH).

Clause 51: The method of any of clauses 40-44, wherein waiting to process the second frame comprises: receiving the second frame prior to the second time; and transmitting the second frame at the second time.

Clause 52: The method of any of clauses 40-44 or 51, further comprising sending the data representative of the expected time between the first frame and the second frame to a downstream network device.

Clause 53: The method of any of clauses 40-44, 51, or 52, wherein the data representative of the expected time between the first frame and the second frame comprises a frame rate value for at least a portion of a media stream for the media data.

Clause 54: The method of clause 53, wherein receiving the frame rate value comprises receiving the frame rate value from a session description protocol (SDP) message.

Clause 55: The method of clause 53, wherein receiving the frame rate value comprises receiving the frame rate value from a payload or header of a Real-time Transport Protocol (RTP) packet or an RTP Control Protocol (RTCP) packet or from a header of a Secure Real-time Transport Protocol (SRTP) packet.

Clause 56: The method of clause 53, further comprising sending data representative of one or more frame rates supported by the network device to the media application, wherein receiving the data representative of the frame rate comprises receiving data representing a selection of a frame rate from the one or more frame rates supported by the network device from the media application.

Clause 57: The method of clause 56, further comprising configuring network transmission for a media session for the media data according to the selection of the frame rate.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of exchanging media data via a network, the method comprising:
   receiving, by a network device, a packet including data for a first frame of the media data and including data representative of an expected time between the first frame of media data and a second frame of the media data from a media application;
   receiving, by the network device, the first frame of the media data at a first time;
   waiting, by the network device, to process the second frame of the media data until a second time that is equal to or greater than the first time plus the expected time; and
   processing, by the network device, the second frame of the media data at the second time.

2. The method of claim 1, wherein the packet comprises one of a Real-time Transport Protocol (RTP) packet, a Real Time Streaming Protocol (RTSP) packet, a Secure Real-time Transport Protocol (SRTP) packet, or an RTP Control Protocol (RTCP) packet.

3. The method of claim 1, further comprising:
   encapsulating the packet with a packet tunnel header; and
   adding the data representative of the expected time between the first frame and the second frame to the packet tunnel header.

4. The method of claim 3, wherein the packet tunnel header comprises a General Packet Radio Service (GPRS) Tunneling Protocol User Data Tunneling (GTP-U) packet header.

5. The method of claim 1, wherein the data representative of the expected time between the first frame and the second frame comprises data representative of an expected time between each of a plurality of frames in a sequence of frames starting with the first frame, the plurality of frames including the first frame and the second frame.

6. The method of claim 1, wherein receiving the packet comprises receiving a packet tunnel header encapsulating the packet, the packet tunnel header including the data representative of the expected time between the first frame and the second frame.

7. The method of claim 6, wherein the packet tunnel header comprises a General Packet Radio Service (GPRS) Tunneling Protocol User Data Tunneling (GTP-U) packet header.

8. The method of claim 1, wherein the data representative of the expected time between the first frame and the second frame is within an Internet Protocol (IP) packet option field of the packet.

9. The method of claim 1,
   wherein waiting to process the second frame comprises not monitoring a data transmission channel until the second time, and
   wherein processing the second frame comprises:
      monitoring the data transmission channel starting at the second time; and
      receiving the second frame via the data transmission channel.

10. The method of claim 9, wherein the data transmission channel comprises a physical downlink control channel (PDCCH).

11. The method of claim 1, wherein waiting to process the second frame comprises:
   receiving the second frame prior to the second time; and
   transmitting the second frame at the second time.

12. The method of claim 1, further comprising sending the data representative of the expected time between the first frame and the second frame to a downstream network device.

13. The method of claim 1, wherein the data representative of the expected time between the first frame and the second frame comprises a frame rate value for at least a portion of a media stream for the media data.

14. The method of claim 13, wherein the frame rate value is contained within a payload or header of a Real-time Transport Protocol (RTP) packet or an RTP Control Protocol (RTCP) packet or from a header of a Secure Real-time Transport Protocol (SRTP) packet.

15. The method of claim 13, further comprising sending data representative of one or more frame rates supported by the network device to the media application, wherein receiving the data representative of the frame rate comprises receiving data representing a selection of a frame rate from the one or more frame rates supported by the network device from the media application.

16. The method of claim 15, further comprising configuring network transmission for a media session for the media data according to the selection of the frame rate.

17. A device for exchanging media data via a network, the device comprising:
    a memory configured to store media data; and
    one or more processors implemented in circuitry and configured to:
        retrieve a packet including data for a first frame of the media data and including data representative of an expected time between the first frame of media data and a second frame of the media data from a media application;
        receive the first frame of the media data at a first time;
        wait to process the second frame of the media data until a second time that is equal to or greater than the first time plus the expected time; and
        process the second frame of the media data at the second time.

18. The device of claim 17, wherein the packet comprises one of a Real-time Transport Protocol (RTP) packet, a Real Time Streaming Protocol (RTSP) packet, a Secure Real-time Transport Protocol (SRTP) packet, or an RTP Control Protocol (RTCP) packet.

19. The device of claim 17, wherein the one or more processors are further configured to:
    encapsulate the packet with a packet tunnel header; and
    add the data representative of the expected time between the first frame and the second frame to the packet tunnel header.

20. The device of claim 19, wherein the packet tunnel header comprises a General Packet Radio Service (GPRS) Tunneling Protocol User Data Tunneling (GTP-U) packet header.

21. The device of claim 17, wherein the data representative of the expected time between the first frame and the second frame, comprises an expected time between each of a plurality of frames in a sequence of frames starting with the first frame, the plurality of frames including the first frame and the second frame.

22. The device of claim 17, wherein to receive the packet the one or more processors are configured to receive a packet tunnel header encapsulating the packet, the packet tunnel header including the data representative of the expected time between the first frame and the second frame.

23. The device of claim 22, wherein the packet tunnel header comprises a General Packet Radio Service (GPRS) Tunneling Protocol User Data Tunneling (GTP-U) packet header.

24. The device of claim 17, wherein the data representative of the expected time between the first frame and the second frame is within an Internet Protocol (IP) packet option field of the packet.

25. The device of claim 17,
    wherein to wait to process the second frame, the one or more processors are configured to not monitor a data transmission channel until the second time, and
    wherein to process the second frame, the one or more processors are configured to:
        monitor the data transmission channel starting at the second time; and
        receive the second frame via the data transmission channel.

26. The device of claim 25, wherein the data transmission channel comprises a physical downlink control channel (PDCCH).

27. The device of claim 17, wherein to wait to process the second frame, the one or more processors are configured to:
    receive the second frame prior to the second time; and
    transmit the second frame at the second time.

28. The device of claim 17, wherein the one or more processors are further configured to send the data representative of the expected time between the first frame and the second frame to a downstream network device.

29. The device of claim 17, wherein the data representative of the expected time between the first frame and the second frame comprises a frame rate value for at least a portion of a media stream for the media data.

30. The device of claim 29, wherein the frame rate value is contained within a payload or header of a Real-time Transport Protocol (RTP) packet or an RTP Control Protocol (RTCP) packet or from a header of a Secure Real-time Transport Protocol (SRTP) packet.

31. The device of claim 29, wherein the one or more processors are further configured to send data representative of one or more frame rates supported by the network device to the media application, wherein to receive the data representative of the frame rate, the one or more processors are configured to receive data representing a selection of a frame rate from the one or more frame rates supported by the network device from the media application.

32. The device of claim 31, wherein the one or more processors are further configured to configure network transmission for a media session for the media data according to the selection of the frame rate.

33. A non-transitory computer-readable storage medium having stored thereon instructions that, when executed, cause a processor of a network device to:
    receive a packet including data for a first frame of media data and including data representative of an expected time between the first frame of media data and a second frame of the media data from a media application;
    receive the first frame of the media data at a first time;
    wait to process the second frame of the media data until a second time that is equal to or greater than the first time plus the expected time; and
    process the second frame of the media data at the second time.

34. The non-transitory computer-readable storage medium of claim 33, wherein the packet comprises one of a Real-time Transport Protocol (RTP) packet, a Real Time Streaming Protocol (RTSP) packet, a Secure Real-time Transport Protocol (SRTP) packet, or an RTP Control Protocol (RTCP) packet.

35. The non-transitory computer-readable storage medium of claim 33, wherein the instructions further cause the processor of the network device to:
    encapsulate the packet with a packet tunnel header; and
    add the data representative of the expected time between the first frame and the second frame to the packet tunnel header.

36. The non-transitory computer-readable storage medium of claim 33, wherein the data representative of the expected time between the first frame and the second frame comprises an expected time between each of a plurality of frames in a sequence of frames starting with the first frame, the plurality of frames including the first frame and the second frame.

37. The non-transitory computer-readable storage medium of claim 33, wherein to receive the packet, the instructions further cause the processor of the network device to receive a packet tunnel header encapsulating the packet, the packet tunnel header including the data representative of the expected time between the first frame and the second frame.

38. The non-transitory computer-readable storage medium of claim 33, wherein the data representative of the expected time between the first frame and the second frame is within an Internet Protocol (IP) packet option field of the packet.

39. The non-transitory computer-readable storage medium of claim 33,
wherein to wait to process the second frame, the instructions further cause the processor of the network device to not monitor a data transmission channel until the second time, and
wherein to process the second frame, the instructions further cause the processor of the network device to:
monitor the data transmission channel starting at the second time; and
receive the second frame via the data transmission channel.

40. The non-transitory computer-readable storage medium of claim 33, wherein to wait to process the second frame, the instructions further cause the processor of the network device to:
receive the second frame prior to the second time; and
transmit the second frame at the second time.

41. The non-transitory computer-readable storage medium of claim 33, wherein the data representative of the expected time between the first frame and the second frame comprises a frame rate value for at least a portion of a media stream for the media data.

42. The non-transitory computer-readable storage medium of claim 41, wherein the instructions further cause the processor of the network device to send data representative of one or more frame rates supported by the network device to the media application, wherein to receive the data representative of the frame rate, the instructions further cause the processor of the network device to receive data representing a selection of a frame rate from the one or more frame rates supported by the network device from the media application.

43. The non-transitory computer-readable storage medium of claim 42, wherein the instructions further cause the processor of the network device to configure network transmission for a media session for the media data according to the selection of the frame rate.

* * * * *